(12) United States Patent
Bastaldo-Tsampalis et al.

(10) Patent No.: US 9,697,235 B2
(45) Date of Patent: Jul. 4, 2017

(54) ON DEVICE IMAGE KEYWORD IDENTIFICATION AND CONTENT OVERLAY

(71) Applicant: Verizon Patent and Licensing Inc., Arlington, VA (US)

(72) Inventors: Brigitte Bastaldo-Tsampalis, Bridgewater, NJ (US); Ning Zhang, Warren, NJ (US); Yuk Lun Li, Morganville, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 65 days.

(21) Appl. No.: 14/332,995

(22) Filed: Jul. 16, 2014

(65) Prior Publication Data

US 2016/0019239 A1    Jan. 21, 2016

(51) Int. Cl.
| | | |
|---|---|---|
| *G06F 17/30* | (2006.01) | |
| *G06K 9/00* | (2006.01) | |
| *G06T 11/60* | (2006.01) | |
| *G09G 5/00* | (2006.01) | |
| *G06K 9/62* | (2006.01) | |
| *G06K 9/32* | (2006.01) | |

(52) U.S. Cl.
CPC .. *G06F 17/30256* (2013.01); *G06F 17/30253* (2013.01); *G06F 17/30268* (2013.01); *G06F 17/30896* (2013.01); *G06K 9/00671* (2013.01); *G06K 9/3258* (2013.01); *G06K 9/6254* (2013.01); *G06T 11/60* (2013.01); *G06K 2209/01* (2013.01); *G09G 2340/125* (2013.01); *G09G 2370/022* (2013.01)

(58) Field of Classification Search
CPC .......... G06F 17/30253; G06K 2209/01; G06K 9/00671; G06K 9/3258; G06K 9/6254; G09G 2340/125; G09G 2370/022
USPC .................................................. 345/632–633
See application file for complete search history.

(56) References Cited

U.S. PATENT DOCUMENTS

| | | | |
|---|---|---|---|
| 8,743,145 B1 * | 6/2014 | Price ..................... | G06T 19/006 345/629 |
| 2008/0273796 A1 * | 11/2008 | Kansal ................... | G06K 9/325 382/176 |
| 2009/0235312 A1 * | 9/2009 | Morad ............... | G06Q 30/0241 725/44 |
| 2010/0161658 A1 * | 6/2010 | Hamynen .......... | H04N 21/6131 707/770 |
| 2011/0320429 A1 * | 12/2011 | Doig ................. | G06F 17/30893 707/711 |
| 2011/0321003 A1 * | 12/2011 | Doig ........................ | G06F 8/34 717/107 |
| 2012/0092329 A1 * | 4/2012 | Koo ..................... | G06K 9/3258 345/419 |

(Continued)

*Primary Examiner* — Jin-Cheng Wang

(57) ABSTRACT

An example of a method of keyword identification and content overlay is described. A mobile device identifies a keyword within a file containing one or more images. The identified keyword is compared to a collection of pre-stored keywords. If the identified keyword matches one of the pre-stored keywords, content corresponding to the matched pre-stored keyword is overlaid onto the image and the image with the overlaid content is displayed. A user of the mobile device can select the overlaid content to retrieve additional information related to the identified keyword.

20 Claims, 6 Drawing Sheets

(56) References Cited

U.S. PATENT DOCUMENTS

| | | | |
|---|---|---|---|
| 2012/0230538 A1* | 9/2012 | Calman | G06F 17/30247 382/103 |
| 2012/0330646 A1* | 12/2012 | Andrade | G06F 17/289 704/7 |
| 2013/0054371 A1* | 2/2013 | Mason | G06Q 30/02 705/14.64 |
| 2013/0129142 A1* | 5/2013 | Miranda-Steiner | G06K 9/00664 382/103 |
| 2013/0173635 A1 | 7/2013 | Sanjeev | |
| 2013/0328931 A1* | 12/2013 | Wolcott | G06T 11/60 345/633 |
| 2014/0036152 A1* | 2/2014 | Jackson | H04N 5/44513 348/564 |
| 2014/0037264 A1* | 2/2014 | Jackson | H04N 5/44513 386/230 |
| 2014/0111542 A1* | 4/2014 | Wan | G06F 17/30253 345/633 |
| 2014/0267723 A1* | 9/2014 | Davidson, Jr. | H04N 7/183 348/147 |
| 2014/0300532 A1* | 10/2014 | Karkkainen | G06F 3/015 345/156 |
| 2015/0092061 A1* | 4/2015 | Chao | G06Q 30/00 348/158 |
| 2015/0100578 A1* | 4/2015 | Rosen | G06F 17/30598 707/737 |
| 2015/0103097 A1* | 4/2015 | Li | G06F 17/30268 345/633 |

\* cited by examiner

ON DEVICE IMAGE KEYWORD IDENTIFICATION AND CONTENT OVERLAY

BACKGROUND

In recent years, the popularity of smart mobile devices, such as smartphones and tablets, has exploded. As part of this explosion in popularity, such devices are being used as cameras to capture photographs or videos. Often, these photographs and/or videos represent memorable and/or otherwise significant moments and contain keywords linking these moments to the surrounding background or depicted activities or events, etc.

In one example, a photo taken with a smart mobile device captures a family's attendance at a ballpark. The ballpark's name is prominently displayed in the photo. When a family member or other individual reviews the photo on the mobile device, the family member may desire more information about the park. While some options may exist to identify the ballpark's name as a keyword and provide the individual with additional information related to the identified keyword, these options typically require installing an additional application on the mobile device and/or sending the photo for processing off of the mobile device, such as to a server of a search engine on the Internet.

As capabilities of smart mobile devices increase, marketers and mobile communications network operators are exploring opportunities to perform keyword identification within a photo or video natively on these smart mobile devices and tie such an identified keyword to additional information. As recognized by the present inventors, what is needed, therefore, is a way to identify a keyword within a photo or video and overlay content corresponding to the identified keyword onto the photo or video without requiring additional user activity or sending the photo/video for processing off of the mobile device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The examples described in detail below relate to a mobile device, a method and a computer for identifying a keyword within an image and overlaying content corresponding to the identified keyword onto the image. The overlaid content provides a link to additional information related to the identified keyword.

In one example, the image is a photo or a frame of a video. The identified keyword, in this example, is text depicted in the photo or the frame of the video. Alternatively, or in addition, the identified keyword is a spoken word or phrase within the audio of the video. The identified keyword is compared to a collection of targeted keywords. Each targeted keyword in the collection also has corresponding content. In one example, a targeted keyword and corresponding content are selected by a content provider or other entity with an interest in the targeted keyword. If the identified keyword matches a targeted keyword, for example, the corresponding content is overlaid on the image. Thus, the corresponding content of the targeted keyword matching the identified keyword is the overlaid content. The overlaid content is, for example, a uniform resource locator (URL) or other link to additional information corresponding to the identified keyword. The additional information is, for example, a web page, video or other information also commonly referred to as content. As such, throughout the specification, corresponding content will refer to the content (e.g., URL, phonebook entry, other actionable item) corresponding to a targeted keyword and overlaid onto an image while the content (e.g., web page, etc.) retrieved as a result of a user selecting the corresponding content will generally be referred to as additional or further information. For example, the identified keyword is a name of a location, venue, landmark or the like, and the corresponding/overlaid content is a URL for a website providing further information about the location or other things of possible interest in the vicinity.

Reference now is made in detail to the examples illustrated in the accompanying drawings and discussed below. A number of the operations involved in keyword recognition and content overlay are implemented in a mobile device in our example. Hence, we will first outline elements of an example of a mobile device and possible use of those elements for relevant operations.

Figure 1:
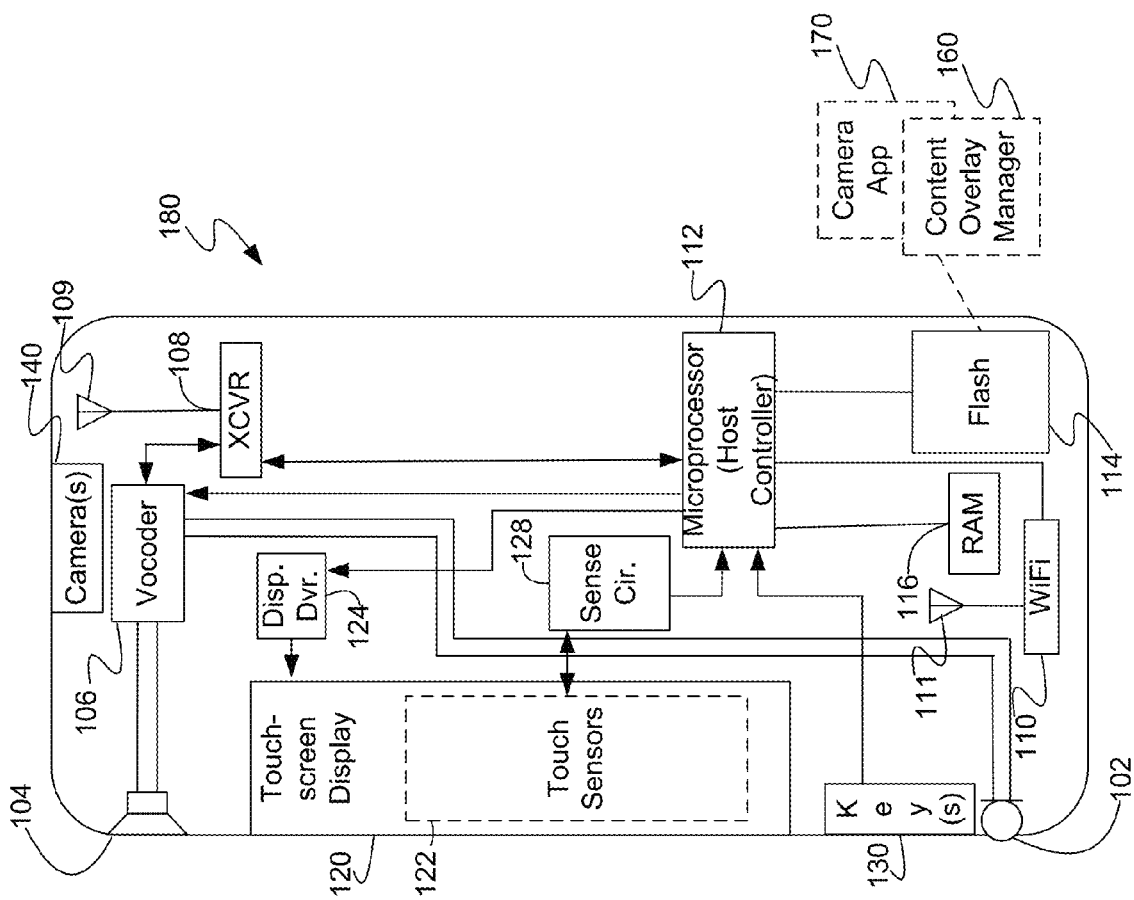
FIG. 1 provides a block diagram illustration of an example of a mobile device.

FIG. 1 illustrates an example of a mobile device 180 that facilitates the identification of a keyword within an image and the overlay of content corresponding to the identified keyword onto the image. The mobile device 180 includes elements and programming to offer the user a wide range of device functions, many of which involve communication. Some of those elements/functions support keyword identification within an image and content overlay onto the image, although other elements/functions remain available for other device uses.

The mobile device 180 includes a microphone 102 for audio signal input and a speaker 104 for audio signal output. The microphone 102 and speaker 104 are communicatively coupled to a voice or audio encoder/decoder (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of audio capture and/or playback as part of video processing.

Also, as shown in FIG. 1, mobile device 180 includes at least one digital transceiver (XCVR) 108, for digital wireless communications via a wide area wireless mobile communication network, although the mobile device 180 may include additional digital or analog transceivers (not shown). The transceiver 108 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 108 provides two-way wireless communication of information including digitized audio signals, still image and/or video signals, web page information for display as well as web related inputs, and various types of mobile message communications to/from the mobile device 180. In particular, such information may represent, for example, a collection of keywords to be compared with an identified keyword within an image along with corresponding content to be overlaid onto the image sent to mobile device 180. In another example, such information may represent an identified keyword sent by mobile device 180 to a comparison server (not shown) and/or an indication that a previously sent identified keyword matches a targeted keyword along with corresponding content to be overlaid onto an image received by mobile device 180.

In one example, the transceiver 108 sends and receives a variety of signaling messages in support of various voice and data services provided by a network of a wireless service provider, to a user of mobile device 180 via the mobile communication network. Transceiver 108 connects through radio frequency (RF) send-and-receive amplifiers (not separately shown) to an antenna 109.

Many modern mobile devices also support wireless local area network communications over Wi-Fi, instead of or in addition to data communications using the wide area mobile communication network. Hence, in the example of FIG. 1, for packet data communications, the exemplary mobile device 180 may also include a Wi-Fi transceiver 110 and associated antenna 111. Although Wi-Fi is used here as the example, the transceiver 110 may take the form of any available two-way wireless local area network transceiver of a type that is compatible with one or more standard protocols of communication implemented in wireless local area networks, such as one of the Wi-Fi standards under IEEE 802.11 and/or WiMAX. The transceiver 110, for example, may provide two-way data transport for wireless communication with a wireless access point in a residence or enterprise that the user frequents or with any available hotspot offered in a public venue. For example, transceiver 110 allows mobile device 180 to request information, such as additional information corresponding to content overlaid onto an image, and receive a response containing such information from an appropriate location. Although communicating through a different network or networks, the transceiver 110 supports various types of data communications similar to the packet data communications supported via the mobile network transceiver 108.

The mobile device 180 further includes a microprocessor, sometimes referred to herein as the host processor 112. A processor is a circuit having elements structured and arranged to perform one or more processing functions, typically various data processing functions. Although discrete logic components could be used, the examples utilize components forming a programmable central processing unit (CPU). A microprocessor, for example, includes one or more integrated circuit (IC) chips incorporating the electronic elements to perform the functions of the CPU. The processor 112, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU or processor hardware in server computers (e.g., FIG. 6) or other user terminal computer equipment (e.g., FIG. 7).

Returning more specifically to the mobile device example of FIG. 1, the microprocessor 112 serves as the programmable controller for mobile device 180 by configuring mobile device 180 to perform various operations, for example, in accordance with instructions or programming executable by processor 112. For example, such operations may include various general operations of the mobile device 180 as well as operations related to the identification of a keyword within an image and the overlay of content corresponding to the identified keyword onto the image. Although a processor may be configured by use of hardwired logic, typical processors in mobile devices are general processing circuits configured by execution of programming.

Depending on the type of device, the mobile device 180 stores and runs an operating system through which specific applications may be run on the device. Examples of operating systems include Android, Apple iOS (iPhone or iPad devices), Windows Mobile, RIM BlackBerry operating system, or the like. Program controlled operations, for example, may include various general operations of the mobile device 180 as well as operations related to the identification of a keyword within an image and the overlay of content corresponding to the identified keyword onto the image, as described in greater detail herein. A flash memory 114 is used to store, for example, programming or instructions, such as a content overlay manager 160, for execution by the processor 112. In one example, content overlay manager 160 is programming or instructions that control operations related to the identification of a keyword within an image and to image processing the overlay content corresponding to the identified keyword onto the image, as discussed below. Flash memory 114 may also be used to store mobile configuration settings for different mobile applications or services executable at mobile device 180 (using processor 112). Mobile device 180 may also include a non-volatile random access memory (RAM) 116 for a working data processing memory.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the identification of a keyword within an image and other image processing, as described herein. Program aspects of the technology may be thought of as "products" or "articles of manufacture" typically in the form of executable code or process instructions and/or associated data that is stored on or embodied in a type of machine or processor readable medium.

A mobile device supporting the identification of a keyword within an image and other image processing under consideration here may include a variety of different types of user interface elements. For discussion purposes, in the smart phone example shown in FIG. 1, the user interface elements of mobile device 180 include a touch screen display 120 (also referred to herein as "touch screen 120" or "display 120"). For output purposes, the touch screen 120 includes a display screen, such as a liquid crystal display (LCD) or the like. For input purposes, touch screen display 120 includes a plurality of touch sensors 122. Other interface elements may include a keypad including one or more keys 130. For example, the keypad may be implemented in hardware as a T9 or QWERTY keyboard of mobile device 180 and keys 130 may correspond to the physical keys of such a keyboard. Alternatively, keys 130 (and keyboard) of mobile device 180 may be implemented as "soft keys" of a virtual keyboard graphically represented in an appropriate arrangement via touch screen display 120. The soft keys presented on the touch screen display 120 may allow the user of mobile device 11A to invoke the same user interface functions as with the physical hardware keys. In some implementations, the microphone 102 and speaker 104 may be used as additional user interface elements, for audio input and output, including with respect to some functions related to the capture of information and communication, as described herein.

In addition, mobile device 180 has one or more image capture sensors 140 (e.g., camera(s)) to capture images (e.g., photo or video) for further processing by microprocessor 112, including processing related to keyword identification and content overlay discussed below. Such captured images may serve as input and thus, camera(s) 140 serve as an additional user input element for mobile device 180. In conjunction with microphone 102, camera(s) 140 may allow mobile device 180 to capture images and associated audio as video. A user of mobile device 180 may utilize camera app 170 to control such image capture by camera(s) 140. As discussed more later, several examples use image capture as part of procedures to identify a keyword within an image and/or associated audio and overlay content corresponding to the identified keyword onto the image.

For output, touch screen display 120 is used to present information (e.g., text, video, graphics or other visible content) to the user of mobile device 180. Host processor 112 controls visible display output on the LCD or other display element of the touch screen display 120 via a display driver 124, to present the various visible outputs to the device user. For example, as described in greater detail below, display 120 is utilized to present an image with overlaid content corresponding to a keyword identified within the image.

In general, touch screen display 120 and touch sensors 122 (and one or more keys 130, if included) are used to provide the textual and graphical user interface for the mobile device 180. In an example, touch screen display 120 provides viewable content, such as an image or a processed image with overlaid content, to the user at mobile device 180. Touch screen display 120 also enables the user to interact directly with the viewable content provided in the content display area, typically by touching the surface of the screen with a finger or an implement such as a stylus. For example, a user of mobile device 180 interacts with display 120 to select overlaid content and receive additional information related to the overlaid content, as discussed further below.

As shown in FIG. 1, the mobile device 180 also includes a sense circuit 128 coupled to touch sensors 122 for detecting the occurrence and relative location/position of each touch with respect to a content display area of touch screen display 120. In this example, sense circuit 128 is configured to provide processor 112 with touch-position information based on user input received via touch sensors 122. In some implementations, processor 112 is configured to correlate the touch position information to specific content being displayed within the content display area on touch screen display 120. The touch-position information captured by sense circuit 128 and provided to processor 112 may include, but is not limited to, coordinates identifying the location of each detected touch with respect to the display area of touch screen display 120 and a timestamp corresponding to each detected touch position.

The user interface capabilities of the mobile device 180 provide output to and receive input from the user of the mobile device 180, for any of the various functions, operations or applications of the device. For example, programming such as content overlay manager 160 configures the mobile device 180 to identify a keyword within an image and overlay content corresponding to the identified keyword onto the image utilizing microprocessor 112 and/or an image processing circuit (not shown).

In one example, a user of mobile device 180 launches camera app 170 which utilizes camera(s) 140 to capture a photo including a depiction of a keyword. The captured photo, in the example, is processed by microprocessor 112 and stored in RAM 116. As discussed in greater detail below, microprocessor 112, as part of the processing, identifies the keyword depicted in the photo and compares the identified keyword to a collection of targeted keywords received via transceiver 108. By performing such keyword identification processing on the mobile device, the user's experience is improved by avoiding any additional delay associated with transferring the photo to a network server and/or otherwise relying on processing remote from the mobile device. Such on device processing also enhances the user's privacy by limiting access to the photo. The collection of targeted keywords, in this example, includes corresponding content for each targeted keyword. If the identified keyword matches a targeted keyword, the captured photo is displayed on display 120 with the corresponding content overlaid onto the photo, as described further below. The user, in this example, can select the overlaid content to retrieve additional information related to the identified keyword (e.g., open a web page in a web browser).

Figure 2:
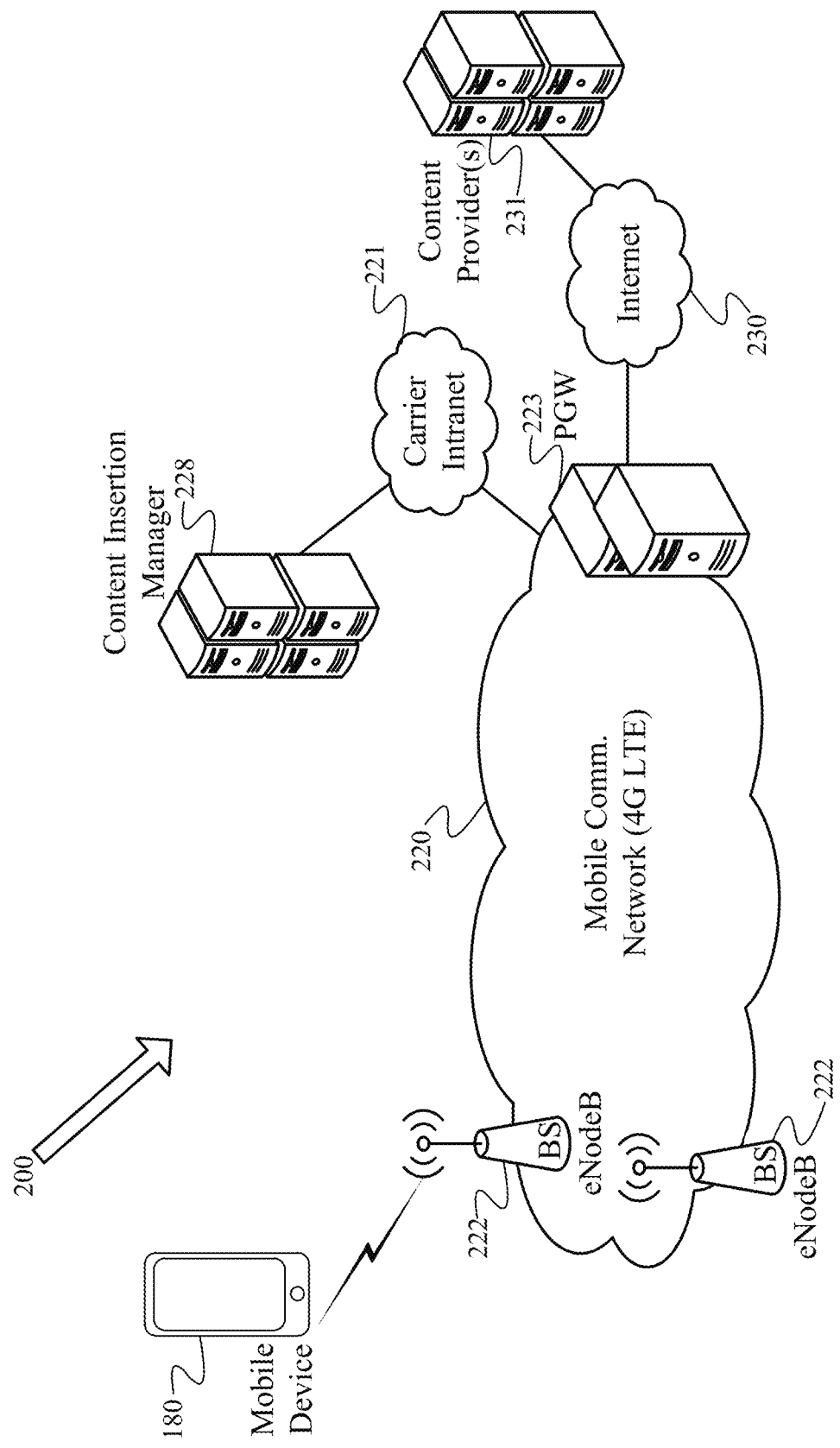
FIG. 2 is a functional block diagram of an example of a communication system, which may implement a method to identify a keyword within an image and overlay content corresponding to the identified keyword onto the image.

FIG. 2 illustrates a functional block diagram of an example of a system 200 that supports various mobile communication services and which may implement a method for identifying a keyword within an image and overlaying content corresponding to the identified keyword onto the image.

The illustrated system 200 services any number of mobile devices, including the illustrated mobile device 180. Mobile device 180 may be a laptop, a personal digital assistant ("PDA"), a smartphone, a tablet PC or another portable device designed to communicate via a wireless network. The mobile device 180 in our example corresponds to a smartphone or tablet itself having network communication capability and a user interface, which in this discussion, may be used in the keyword identification and content overlay procedures.

The illustrated system example includes a mobile communication network 220, in this case, operated in accordance with 4G LTE standards. Mobile network 220 may provide mobile telephone communications as well as Internet data communication services. For example, mobile network 220 may connect to public packet-switched data communication networks such as the Internet 230 via packet data gateway (PGW) 223. Data communications via mobile network 220 provided for users of devices like 180 may support a variety of services such as communications of text and multimedia messages, e-mail, web browsing, streaming or downloading content, etc. with network connected equipment represented generically by content provider(s) 231. Voice communication also may involve transport via the Internet 230 using voice over Internet Protocol (VoIP) technologies. Mobile device 180 may connect to mobile network 220 through a cellular base station 222, two of which appear in the drawing by way of example.

For convenience only, the drawings and description use terms like base station (BS) originally developed to describe elements of older mobile network technologies. The terms are used here, however, in a broader sense to also encompass equipment used for similar wireless link and routing/control purposes in more modern network technologies. In a 4G wireless network, for example, each wireless access node corresponding to one of the illustrated base stations may take the form of a node referred to as an eNodeB, and the wireless mobile devices are types of user equipment (UE) devices. Packet routing and control functions may be implemented in packet routers and/or associated server platforms in the radio access network (RAN) or in many cases in elements of an IP Multimedia Service (IMS) core network (not shown separately) coupled to some number of 4G RANs, although such routing and control element(s) are generically included in the broad class of devices that may be used to implement the network functionality discussed here.

The carrier that operates the network 220 will also utilize a variety of other systems for related purposes, such as maintenance, accounting and provisioning. In the example, the carrier has another data network, e.g. Intranet 221, that provides data communications for other data systems used by the carrier; and that network 221 has connectivity into the network 220 that provides the actual communications services to the carrier's customers. For purposes of the present discussion, equipment communicating via the network 221 includes a content insertion manager 228 that will be involved in the management of a collection of keywords to be compared with an identified keyword within an image along with corresponding content to be overlaid onto the image in the keyword identification and content overlay solution.

As described in greater detail below, system 200 allows various elements to interact in the identification of a keyword within an image and the overlay of content corresponding to the identified keyword onto the image. For example, one or more content providers 231 deliver content corresponding to targeted keywords to content insertion manager 228. Content insertion manager 228, in turn, delivers a collection of the targeted keywords along with the corresponding content to mobile device 180. When mobile device 180 identifies a keyword within an image that matches one of the targeted keywords, mobile device 180 overlays the corresponding content onto the image and displays the image and overlaid content to a user of mobile device 180. Upon selection of the corresponding content from the displayed image, additional information related to the corresponding content, and thus the matched identified keyword and targeted keyword, is provided, for example, by the appropriate content provider 231.

Figure 3:
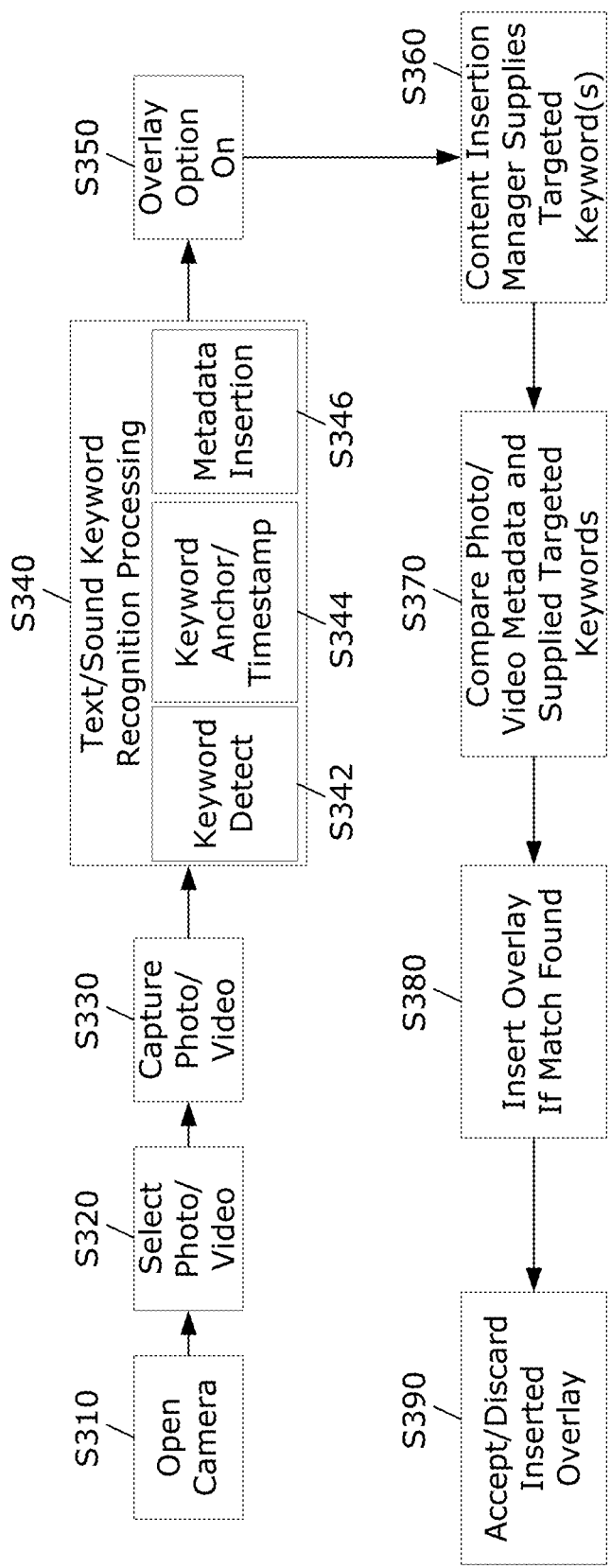
FIG. 3 is a flow diagram of an example of steps involved in capturing an image, identifying a keyword within the image and overlaying content corresponding to the identified keyword onto the image.

FIG. 3 depicts an example of a process flow for identifying a keyword from a captured image and overlaying content corresponding to the identified keyword onto the image if the identified keyword matches a targeted keyword from a collection of targeted keywords. Although the steps of the process are referenced with sequential reference numbers, no such order of steps is required and various steps may be performed in any order and/or repeatedly performed, as described in greater detail below.

In one example, a user of mobile device 180 opens a camera app 170, such as a native camera application of mobile device 180, in step S310. Although this example makes reference to camera app 170 as the native camera application of mobile device 180, camera app 170 may also be an additional camera application, such as one written by a third-party or other developer. In step S320, the user, in this example, selects whether to capture a photo or a video utilizing camera app 170. After the user selects which type of image to capture, the user, in step S330, captures a desired image, such as a photo or a video. For example, camera app 170 utilizes camera(s) 140 to capture an image, in the case of a photo, or the camera application utilizes camera(s) 140 to capture multiple images and microphone 102 to capture audio, in the case of a video. Such captured photo or video is digitized, formatted within a file and maintained in memory, such as RAM 116, for further processing by mobile device 180.

Further processing of the file representing the captured photo or video includes, for example, text and/or sound keyword recognition in step S340. Step S340 includes, for example, three substeps. In substep S342, for example, the file is processed to detect one or more keywords within the file. Such keyword detection is, for example, based on well-known processes and procedures for detecting a keyword within a file including text recognition, optical character recognition (OCR), pattern recognition, sound recognition and other processes and procedures for detecting a keyword in a photo, a video, and/or audio. For example, OCR is utilized to identify characters forming a name emblazoned on a side of a building depicted in a photo. Alternatively, or in addition, sound recognition, for example, is utilized to identify the emblazoned name spoken by an individual within a video.

In one example, any and all keywords that are detectable within the file are detected. Alternatively, the keyword detection of substep S342 is configurable to only detect some subset of detectable keywords. Such configuration may be performed by a user of mobile device 180, a manufacturer of mobile device 180, the network operator of network 220, a provider of the keyword detection processing, and/or some other third party. For example, although such keyword detection of substep S342 is not to be confused with keyword matching discussed further below in relation to step S370, performing detection of only those keywords that are part of a collection of targeted keywords reduces the amount of processing to be performed by the mobile device 180. As such, the collection of targeted keywords may define a sufficient subset of keywords to be detected and, thus, keyword detection is, for example, limited to the subset defined by the targeted keyword collection. On the other hand, because the file may be included in subsequent processing, such as described below in relation to FIG. 4, and/or because the collection of targeted keywords may change over time, the collection of targeted keywords may not define a sufficient subset of keywords to be detected and, thus, keyword detection is, for example, not limited to any subset or at least not the subset defined by the targeted keyword collection. At the same time, however, any one of or some combination of the various processes and procedures for detecting a keyword may be limited, based on capability and/or configuration, in which keywords are detectable within the file (e.g., OCR may be unable to detect a blurry keyword, sound recognition may be unable to determine a muffled keyword, keyword detection may be configured to avoid detecting vulgar or otherwise offensive keywords).

In one example, the file represents an image taken as a photo. In this example, the photo includes a building with a name emblazoned on the side of the building. The name is, for example, a company name of a tenant within the building or an owner of the building or otherwise represents the name of the building. Keyword detection, in this example, utilizes text recognition to detect the name emblazoned on the building.

In another example, the file represents multiple images and audio captured as a video. In this example, the video depicts a group of people (e.g., family, friends, tourists, school class) walking past a building, such as a stadium, museum, or other location, while discussing the building or some event occurring or to occur within the building. For example, the building is a sports stadium and one of the people mentions a name of a team participating in an event that the group will be attending. Keyword detection, in this example, utilizes voice recognition to detect the team name.

In substep S344, a location of the keyword within the file is determined. For example, in the building photo, the location of the name emblazoned on the building is determined as an x,y coordinate of an anchor location of the keyword within the photo. In the group video, for example, the location of the team name being mentioned is determined as a timestamp within the video where the word was recognized in the accompanying audio track. In substep S346, the detected keyword, the determined keyword location, and other information related to the keyword and/or file (e.g., time of capture, type of file, user, etc.) are inserted into the file as metadata.

In step S350, mobile device 180 determines, for example, whether an overlay option is on and/or otherwise selected. For example, the overlay option is a global setting within the configuration of mobile device 180. Alternatively, or in addition, the overlay option is a setting within the camera application utilized to capture the image. Still further, the overlay option is a prompt issued by mobile device 180 and/or the camera application each time a new image is processed. The overlay option, for example, controls whether any further matching of the identified keyword and content overlay will be performed. If the overlay option is not on, processing related to the identified keyword ends in step S350. Otherwise, if the overlay option is on, processing proceeds to step S360.

In step S360, content insertion manager 228 supplies, for example, a collection of targeted keywords along with content corresponding to each targeted keyword to mobile device 180. As discussed above in relation to FIG. 2, each targeted keyword and corresponding content relates to a content provider 231. The content provider 231 is, for example, an individual, group or organization with an interest in the targeted keyword. In the above photo example, the identified keyword is the name emblazoned on the building and the related content provider 231 is, for example, the organization whose name is emblazoned on the building. In the above video example, the identified keyword is the team name and the related content provider 231 is, for example, the entity that owns/operates the team. In each of these examples, the corresponding content is content selected by the individual, group or organization with the interest in the targeted keyword. In one example, the corresponding content is a URL that, when selected by a user of mobile device 180, initiates a request for a web page owned and/or otherwise maintained by the content provider 231. Although the preceding example explicitly references a web page, it is well known that a URL may be utilized to link to and/or otherwise reference any number of different types of additional or further information available via network communications (e.g., e-mail, SMS, image, etc.). Alternatively, or in addition, the corresponding content may be contact information, such as an address book entry for the individual, group, or organization, a logo, an advertisement, coupon or other offer, a tagline, or any other content selected by the content provider 231.

In one example, multiple content providers 231 each have an interest in a particular targeted keyword. The targeted keyword is, for example, a building name, but the building contains multiple tenants and each tenant would like their own content to correspond to the targeted keyword. In addition, the building owner, who may or may not also be a tenant, would like to select the corresponding content. In this example, the operator of network 220 and/or some other third party that owns or otherwise maintains and operates content insertion manager 228 controls which content provider 231 provides the corresponding content for each targeted keyword. For example, each content provider 231 with an interest in a particular keyword provides a bid representing a value each content provider 231 assigns to the particular keyword. The value is, for example, a monetary value. Thus, each bid represents, for example, the amount each content provider is willing to pay for their content to be the corresponding content for the particular keyword. In turn, the corresponding content represents, for example, the content provided by the content provider 231 with the highest bid.

It should be noted that, although the step of supplying the targeted keywords by the content insertion manager is depicted as step S360, this step could be performed earlier in the process flow of FIG. 3 and/or at some time prior to commencing the process. Furthermore, in some examples, if the targeted keywords are provided earlier, step S360 may represent an update of any previously provided targeted keywords and/or corresponding content, such as when content provider 231 updates content corresponding to a particular targeted keyword or content provider 231 selects an additional targeted keyword (e.g., content provider 231 provides the highest bid).

In step S370, for example, any identified keyword within the file metadata is compared to the collection of targeted keywords supplied by the content insertion manager 228 to determine if a match exists. That is, in some examples, the keyword detection of substep S342 includes more or fewer identified keywords then those targeted keywords within the collection supplied by content insertion manager 228.

In step S380, if an identified keyword matches a targeted keyword from the collection provided by content insertion manager 228, the content corresponding to the matched targeted keyword is overlaid onto the image and the image with the overlaid content is displayed to the user of mobile device 180. Such match occurs, for example, when an identified keyword is substantially the same as a targeted keyword. Matching need not be absolute in order to drive the further processing to identify, obtain and overlay content. A match may be found, for example, in response to a determination that an identified keyword is at least substantially identical to a pre-stored keyword. The degree of identity between words for matching may be determined by a threshold established by the service provider or other entity offering and managing the application, which is deemed by that party to be sufficient for purposes of the service. For example, a service provider selling ads via the matching and overlay functions may determine that a 75% or higher degree of identity is a sufficient match to perform the further steps to overlay the related content for an ad on the image. To minimize errors and provide a better user experience, another service provider may set the application to require a 90% or higher degree of identity between an identified keyword and a pre-stored keyword.

In one example, the location of the overlaid content corresponds to the location of the identified keyword within the file. In a photo, for example, the overlaid content location corresponds to the x,y coordinate of the anchor location of the identified keyword location. For example, the overlaid content is placed directly over the identified keyword such that the identified keyword is partially or wholly obscured by the overlaid content. Alternatively, the overlaid content is placed near the identified keyword (e.g., directly above, directly below). In a further example, if multiple identified keywords exist within the file, particularly if two or more of those identified keywords are in close proximity, the location of corresponding overlaid content for each corresponding identified keyword is adjusted such that the various overlaid content is clearly visible. In a video, for example, the overlaid content location corresponds to the timestamp of the identified keyword location.

In step S390, the user is presented an option to accept or discard the overlaid content. For example, the overlaid content includes an X or other mark that, when selected by the user, removes the overlaid content from the file. In this example, if the user does not select the X or other mark, the overlaid content remains.

Figure 4:
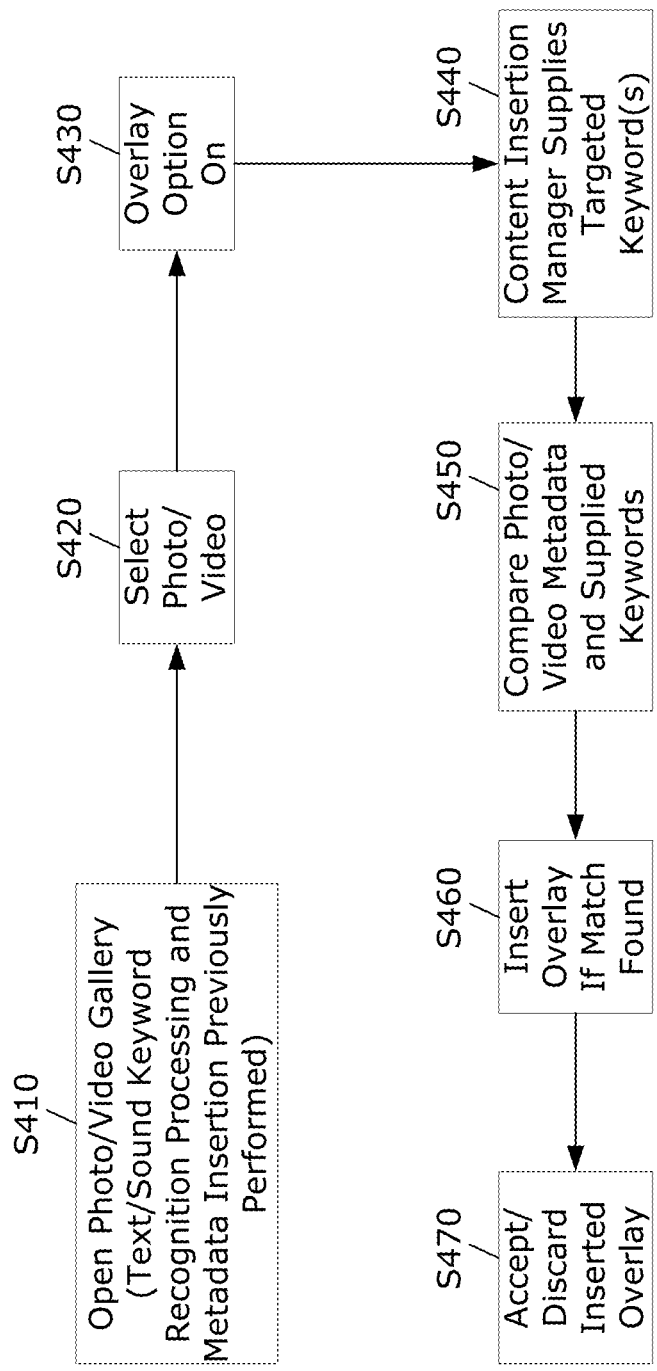
FIG. 4 is a flow diagram of an example of steps involved in identifying a keyword within a stored image and overlaying content corresponding to the identified keyword onto the image.

The process flow example of FIG. 3 depicts keyword detection processing performed as part of capturing or otherwise acquiring a new image, such as a photo or video. The process flow example of FIG. 3 also depicts the overlay of content corresponding to an identified keyword within the new image as part of displaying the new image to the user of mobile device 180. FIG. 4 depicts an example of a process flow to overlay content corresponding to an identified keyword within a previously captured image.

In step S410, a user of mobile device 180 opens an image gallery, such as a native image gallery application of mobile device 180. In one example, one, some or all of the various images (e.g., photos and/or videos) include metadata related to one or more identified keywords as a result of previous processing, such as the text/sound keyword recognition processing of step S340 in FIG. 3. In step S420, the user selects, for example, one of the images within the gallery. The selected image includes, for example, metadata related to one or more identified keywords within the image as a result of previous processing, such as the text/sound keyword recognition processing of step S340 in FIG. 3. Subsequent steps S430-S470 are similar to steps S350-S390 of FIG. 3. Although the various steps are presented in a sequential fashion, no such order is required and the steps may be performed in a differing order.

In step S430, mobile device 180 determines whether an overlay option is on. If the overlay option is not on, the process flow terminates. If the overlay option is on, the process flow proceeds to step S440. In step S440, content insertion manager 228 supplies, for example, a collection of targeted keywords along with corresponding content. As discussed above in relation to FIG. 3, content insertion manager 228 may supply such targeted keyword collection earlier within the process flow example or prior to commencement of the process flow example. If the targeted keyword collection is provided prior to commencement of the process flow example, content insertion manager, in step S440, may provide an update to the previously provided targeted keyword collection.

In step S450, any identified keyword within the metadata of the selected image is compared, for example, to each targeted keyword within the collection supplied by content insertion manager 228. If a match is found, in step S460, the corresponding content, for example, is overlaid onto the image and the image with the overlaid content is displayed to the user. In step S470, the user, for example, is prompted to accept or discard the overlaid content.

Figure 5:
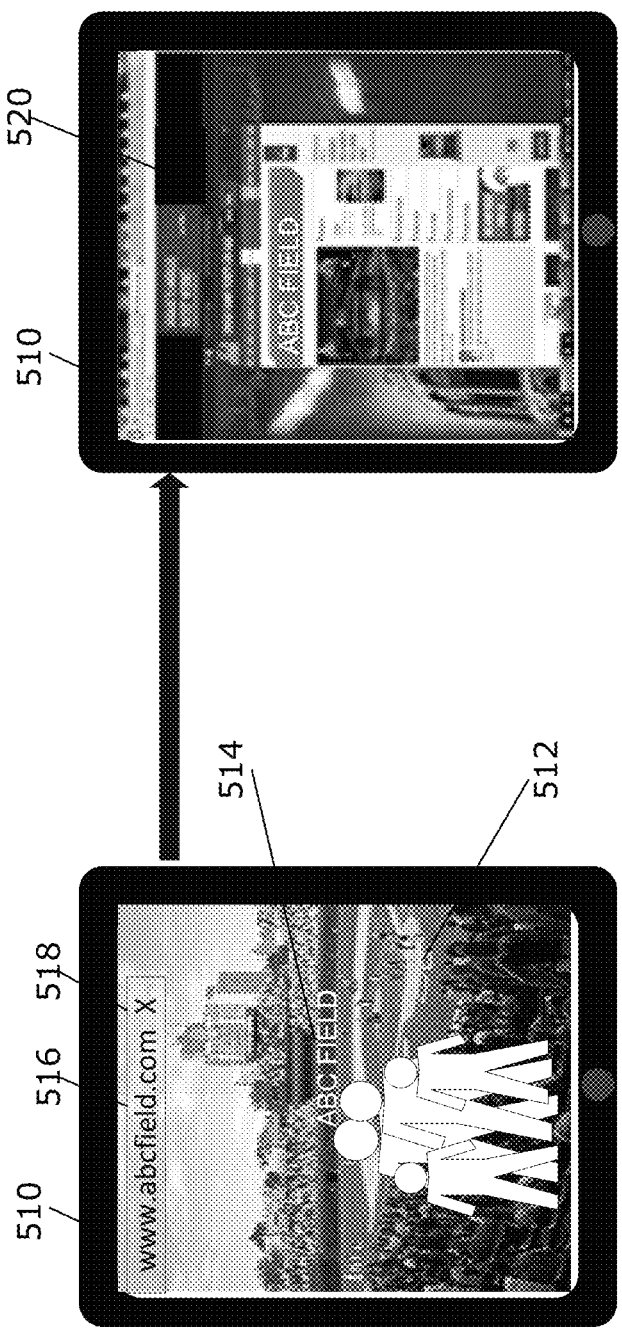
FIG. 5 provides front views of an example of a mobile device, one of which shows display of an image with overlaid content and another of which shows display of additional information related to the overlaid content.

At this point, it might be helpful to provide an example of a mobile device displaying an image with overlaid content as well as the mobile device displaying additional information related to the overlaid content. FIG. 5 depicts an example of such a mobile device. In FIG. 5, mobile device 510 is depicted as a tablet, although no such requirement exists. Mobile device 510 initially (on the left) displays a photo 512 depicting, for example, a family at a baseball game. Photo 512 also depicts, for example, the name of the baseball field (e.g., ABC FIELD). In this example, the baseball field name is an identified keyword 514 within photo 512. After further image processing, such as that described above in relation to FIGS. 3-4, photo 512 also includes overlaid content 516. In this example, the overlaid content 516 is a URL (e.g., www.abcfield.com). The overlaid content 516 also includes, for example, an option 518 for a user to discard the overlaid content.

As described above, the overlaid content 516 is user selectable and relates to additional information. In this example, the additional information is a website 520 providing additional information about the baseball field (e.g., ABC FIELD). This website 520 is displayed by mobile device 510 after selection of the overlaid content 516 (on the right). In this way, a user may quickly access additional information about objects and/or locations depicted within images.

As shown by the discussion above, aspects of the keyword identification and content overlay techniques may be implemented by appropriate programming of a mobile device and/or one or more server computers. FIG. 1 and the discussion thereof covered an example of a mobile device that may utilize relevant client side programming. It may be helpful to briefly consider computer platforms that may utilize relevant server side programming.

Figures 6, 7:
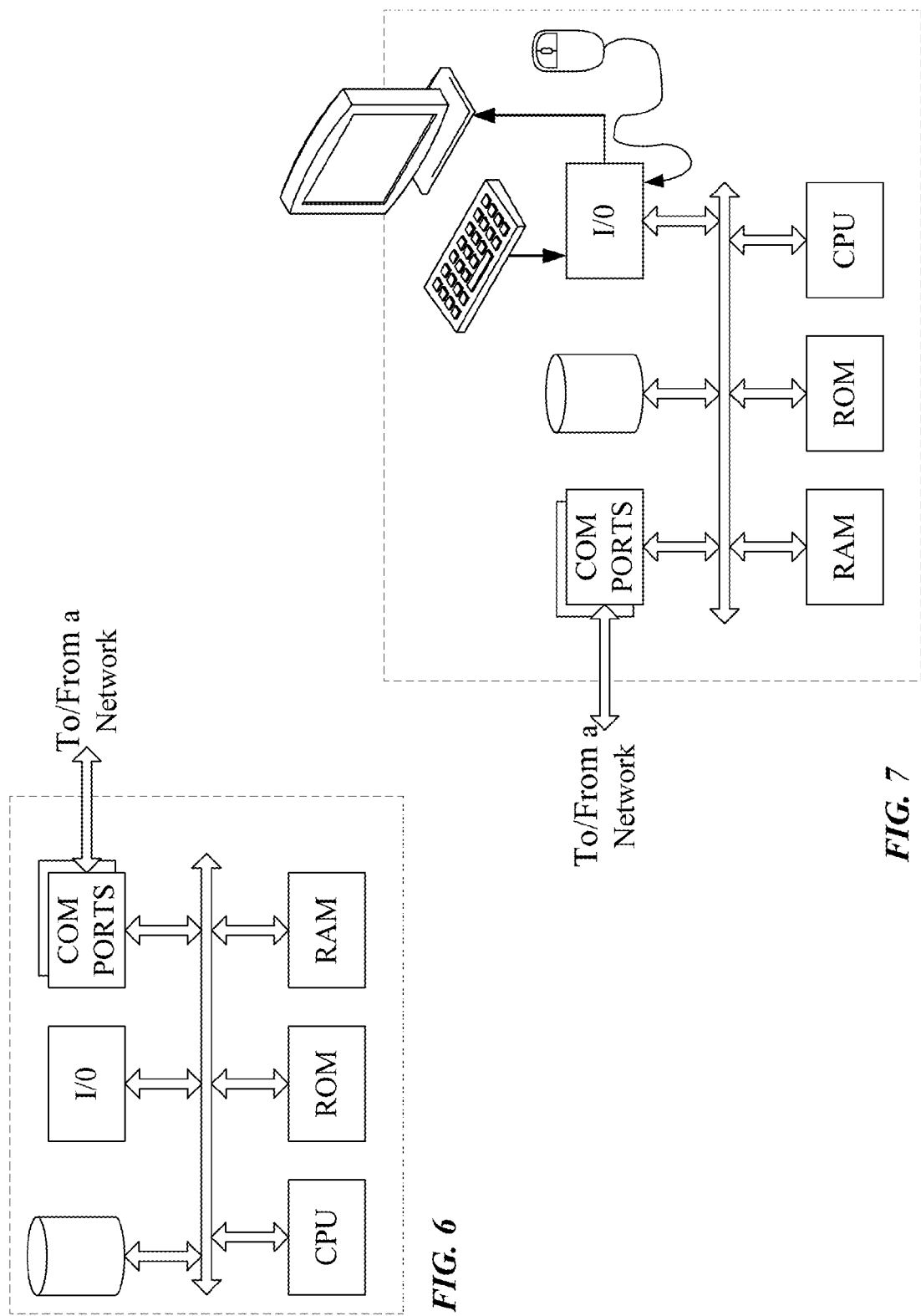
FIG. 6 provides a block diagram of a general purpose computer hardware platform that may be configured as a host or server, for example, to function as any of the server computers shown in FIG. 2.
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server, for example, such as that of the content provider 231 or the content insertion manager 228. FIG. 7 depicts a computer with user interface elements, as may be used to implement a personal computer or other type of work station or terminal device, although the computer of FIG. 7 may also act as a server if appropriately programmed. It is believed that the general structure and general operation of such equipment as shown in FIGS. 6 and 7 should be self-explanatory from the high-level illustrations.

A computer for use as a server, for example, includes a data communication interface for packet data communication (see FIG. 6). The server also includes a central processing unit (CPU), in the form of one or more processors, for executing program instructions. Although processor(s) forming the CPU may be similar to the microprocessor used in the mobile device of FIG. 1, host or server computer platforms typically use somewhat different circuit architectures, e.g. to provide more processor power. The server platform typically includes an internal communication bus, program storage, and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. The software programming relating to keyword identification and content overlay techniques discussed herein may be downloaded and/or updated from a computer platform, for example, to configure the content insertion manager 228 or other server (e.g. FIG. 2) or from a host computer or the like communicating with the mobile device (e.g. FIG. 1) via the network (e.g. FIG. 2) to download an appropriate application.

A computer type user terminal device, such as a PC or tablet computer, similarly includes a data communication interface CPU, main memory and one or more mass storage devices for storing user data and the various executable programs (see FIG. 7). Although processor(s) forming the CPU may be similar to the microprocessor used in the mobile device of FIG. 1, host or server computer platforms typically use somewhat different architectures, e.g. to provide more processor power. A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of keyword identification, content overlay and related communications outlined above may be embodied in programming. Program aspects of the technology may be thought of as "products" or "articles of manufacture" typically in the form of executable code and/or associated data, such as a collection of targeted keywords along with corresponding content, that is carried on or embodied in a type of machine readable medium. Executable code, for example, may take the form of software, firmware, microcode, or the like of the type suitable for execution by the particular processor hardware of the mobile device, other user terminal device or server platform, so as to configure the respective equipment to perform functions like those discussed herein.

"Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory or tangible storage media, more general terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device, comprising:
one or more processors to:
receive a plurality of keywords from a keyword match database;
obtain a file containing one or more images and an audio track;
process the file to:
identify a set of keywords included within the file and included in the plurality of keywords of the keyword match database;
determine, for a keyword within the set of keywords, that the keyword matches a pre-stored keyword in the keyword match database,
the keyword matching the pre-stored keyword when a degree of match between the keyword and the pre-stored keyword satisfies a predetermined threshold;
determine, based on determining that the keyword matches the pre-stored keyword in the keyword match database, an overlay location associated with a respective image of the one or more images,
the overlay location being determined based on a timestamp associated with where the keyword is identified in the audio track, and
the overlay location being adjusted, to an adjusted overlay location associated with the respective image, so that content associated with the pre-stored keyword is visible with respect to other content associated with another overlay location;
overlay, based on determining the overlay location associated with the respective image of the one or more images, the content associated with the pre-stored keyword, at the adjusted overlay location associated with the respective image of the one or more images; and
provide, for display, the respective image with the content overlaid at the adjusted overlay location associated with the respective image.

2. The mobile device of claim 1, wherein, when obtaining the file, the one or more processors are to at least one of:
receive the one or more images of the file from an image capture sensor associated with the mobile device;
retrieve the file from a memory associated with the mobile device; or
receive the file via a communication interface associated with the mobile device.

3. The mobile device of claim 1, wherein:
the file includes a photograph; and
when processing the file to identify the set of keywords, the one or more processors are to:
identify, based on one or more of text recognition, optical character recognition, or pattern recognition, the set of keywords within the photograph;
determine one or more coordinate locations of the set of keywords within the photograph based on identifying the set of keywords within the photograph; and
insert the one or more coordinate locations of the set of keywords into metadata associated with the photograph.

4. The mobile device of claim 1, wherein:
the file contains a video; and
when processing the file to identify the set of keywords, the one or more processors are to:
identify, based on text recognition or speech recognition, the set of keywords within the video;
determine one or more timestamps of the set of keywords within the video based on identifying the set of keywords within the video; and
insert the one or more timestamps of the set of keywords into metadata associated with the video.

5. The mobile device of claim 1, where the one or more processors are further to:
receive, from a mobile wireless communication network, the plurality of keywords of the keyword match database, and the content associated with the pre-stored keyword; and
store the plurality of keywords of the keyword match database and the content associated with the pre-stored keyword.

6. The mobile device of claim 5, where the one or more processors are further to:
receive, from the mobile wireless communication network, a periodic update to the plurality of keywords of the keyword match database.

7. The mobile device of claim 1, wherein, when determining that the keyword matches the pre-stored keyword in the keyword match database, the one or more processors are to:
compare the keyword with the pre-stored keyword in the keyword match database; and
determine that the keyword matches the pre-stored keyword when the keyword and the pre-stored keyword are at least substantially identical.

8. The mobile device of claim 1, where the one or more processors are further to:
send the keyword to a keyword match database server; and
receive, from the keyword match database server, the content associated with the pre-stored keyword when the keyword match database server determines that the keyword and the pre-stored keyword are substantially identical.

9. The mobile device of claim 1, where the one or more processors are further to:
prompt a user to accept or deny the content overlaid at the adjusted overlay location; and
store the respective image, with the content overlaid at the adjusted overlay location, when the user accepts of the content overlaid at the adjusted overlay location.

10. The mobile device of claim 1, wherein the content includes a uniform resource locator and the one or more processors are further to:
  receive selection of the uniform resource locator by a user;
  initiate execution of an application on the mobile device to access the uniform resource locator;
  access, via the application, the uniform resource locator; and
  provide, for display, content obtained as a result of accessing the uniform resource locator.

11. A method, comprising:
  receiving, by a mobile device, a plurality of keywords from a keyword match database;
  obtaining, by the mobile device, a file containing one or more images and an audio track;
  processing, by the mobile device, the file to:
    identify a set of keywords included within the file and included in the plurality of keywords of the keyword match database;
    determining, by the mobile device and for a keyword within the set of keywords, that the keyword matches a pre-stored keyword in the keyword match database, the keyword matching the pre-stored keyword when a degree of match between the keyword and the pre-stored keyword satisfies a predetermined threshold;
    determining, by the mobile device and based on determining that the keyword matches the pre-stored keyword in the keyword match database, an overlay location associated with a respective image of the one or more images,
      the overlay location being determined based on a timestamp associated with where the keyword is identified in the audio track, and
      the overlay location being adjusted, to an adjusted overlay location associated with the respective image, so that content associated with the pre-stored keyword is visible with respect to other content associated with another overlay location;
    overlaying, by the mobile device and based on determining the overlay location associated with the respective image of the one or more images, the content associated with the pre-stored keyword, at the adjusted overlay location associated with the respective image of the one or more images; and
    providing, by the mobile device and for display, the respective image with the content overlaid at the adjusted overlay location associated with the respective image.

12. The method of claim 11, wherein obtaining the file comprises at least one of:
  receiving the one or more images of the file from an image capture sensor associated with the mobile device;
  retrieving the file from a memory of the mobile device; or
  receiving the file via a communication interface of the mobile device.

13. The method of claim 11, wherein processing the file to identify the set of keywords within the file comprises:
  identifying, via one or more of text recognition, optical character recognition, pattern recognition, or sound recognition, the set of keywords within the file,
    the file containing one of a photograph or a video;
  determining one or more locations of the set of keywords within the file,
    the one or more locations being one of one or more coordinate locations of the set of keywords within the photograph or one or more timestamp locations of the set of keywords within the video; and
  inserting the one or more coordinate locations into metadata associated with the photograph or the one or more timestamp locations into metadata associated with the video.

14. The method of claim 11, further comprising:
  receiving, from a mobile wireless communication network, the plurality of keywords of the keyword match database, and the content associated with the pre-stored keyword; and
  storing plurality of keywords of the keyword match database and the content associated with the pre-stored keyword.

15. The method of claim 14, further comprising:
  receiving, from the mobile wireless communication network, a periodic update to the plurality of keywords of the keyword match database.

16. The method of claim 11, wherein determining that the keyword matches the pre-stored keyword in the keyword match database comprises:
  comparing the keyword with the pre-stored keyword in the keyword match database; and
  determining the keyword matches the pre-stored keyword when the keyword and the pre-stored keyword are at least substantially identical.

17. The method of claim 11, where the method further comprises:
  sending the keyword to a keyword match database server; and
  receiving, from the keyword match database server, the content associated with the pre-stored keyword when the keyword match database server determines that the keyword and the pre-stored keyword are at least substantially identical.

18. The method of claim 11, where the method further comprises:
  prompting a user of the mobile device to accept or deny the content overlaid at the adjusted overlay location; and
  storing the respective image, with the content overlaid at the adjusted overlay location, when the user accepts the content overlaid at the adjusted overlay location.

19. The method of claim 11, wherein the content includes a uniform resource locator and the method further comprises:
  receiving selection of the uniform resource locator by a user of the mobile device;
  executing an application to access the uniform resource locator;
  accessing, via the application, the uniform resource locator; and
  providing, for display, content obtained as a result of accessing the uniform resource locator.

20. A non-transitory computer-readable medium storing instructions, the instructions comprising:
  one or more instructions that, when executed by one or more processors of a mobile device, cause the one or more processors to:
    receive a plurality of keywords from a keyword match database;
    obtain a file containing one or more images and an audio track;
    process the file to:
      identify a set of keywords included within the file and included in the plurality of keywords of the keyword match database;

determine, for a keyword within the set of keywords, that the keyword matches a pre-stored keyword in the keyword match database,
the keyword matching the pre-stored keyword when a degree of match between the keyword and the pre-stored keyword satisfies a predetermined threshold;
determine, based on determining that the keyword matches the pre-stored keyword in the keyword match database, an overlay location associated with a respective image of the one or more images,
the overlay location being determined based on a timestamp associated with where the keyword is identified in the audio track, and
the overlay location being adjusted, to an adjusted overlay location associated with the respective image, so that content associated with the pre-stored keyword is visible with respect to other content associated with another overlay location;
overlay, based on determining the overlay location associated with the respective image of the one or more images, the content associated with the pre-stored keyword, at the adjusted overlay location associated with the respective image of the one or more images; and
provide, for display, the respective image with the content overlaid at the adjusted overlay location associated with the respective image.

* * * * *